United States Patent
Arndt et al.

(10) Patent No.: US 8,721,941 B2
(45) Date of Patent: May 13, 2014

(54) ARRANGEMENT AND METHOD FOR THE ELECTROMECHANICAL DRIVE FOR MOLDING CLOSING SYSTEMS AND CALIBRATION BLOW MANDREL SYSTEMS IN BLOW MOLDING MACHINES

(75) Inventors: Torsten Arndt, Heidesse (DE); Norbert Nimpsch, Berlin (DE); Stefan Szczepanski, Berlin (DE)

(73) Assignee: Uniloy Milacron Germany GmbH, Grossbeeren (DE)

( * ) Notice: Subject to any disclaimer, the term of this patent is extended or adjusted under 35 U.S.C. 154(b) by 186 days.

(21) Appl. No.: 13/319,623

(22) PCT Filed: May 12, 2010

(86) PCT No.: PCT/EP2010/003046
§ 371 (c)(1),
(2), (4) Date: Jan. 31, 2012

(87) PCT Pub. No.: WO2010/130467
PCT Pub. Date: Nov. 18, 2010

(65) Prior Publication Data
US 2012/0135097 A1    May 31, 2012

Related U.S. Application Data

(60) Provisional application No. 61/177,770, filed on May 13, 2009.

(30) Foreign Application Priority Data

May 13, 2009   (EP) ..................................... 09075229

(51) Int. Cl.
*B29C 49/56*     (2006.01)
*B29C 49/76*     (2006.01)

(52) U.S. Cl.
USPC .......... 264/40.5; 264/540; 425/150; 425/214; 425/535; 425/541

(58) Field of Classification Search
USPC ................. 425/150, 214, 522, 532, 535, 541; 264/40.1, 40.5, 523, 540
See application file for complete search history.

(56) References Cited

U.S. PATENT DOCUMENTS

| | | | |
|---|---|---|---|
| 4,702,688 A | | 10/1987 | Schenk |
| 5,478,229 A | * | 12/1995 | Kato et al. ..................... 425/532 |
| 6,923,636 B2 | * | 8/2005 | Langos et al. ................ 425/214 |
| 2003/0017229 A1 | | 1/2003 | Langos et al. |

FOREIGN PATENT DOCUMENTS

| | | |
|---|---|---|
| DE | 2001 5590 | 2/2001 |
| EP | 1 300 234 | 4/2003 |
| JP | 2002 206 7135 | 3/2002 |

* cited by examiner

Primary Examiner — James Mackey
(74) Attorney, Agent, or Firm — Fay Kaplun & Marcin, LLP

(57) ABSTRACT

The invention relates to an arrangement and to a method for the electromechanical drive for mold closing systems and calibration blow mandrel systems in blow molding machines, wherein the arrangement for the drive of an extrusion blow molding machine includes a push mechanism (3; 11), a push rod (4; 12) and exactly one electric motor (1; 9), wherein the push rod (4; 12) is movable by the push mechanism (3; 11) which is driven by the electric motor (1; 9), wherein the electric motor (1; 9) has an additional braking device (2; 10) which can be activated on the reaching of a required torque or a required force of the electric motor (2; 10) to hold the push rod (4; 12) in a state of maximum tension in its instantaneous position.

13 Claims, 1 Drawing Sheet

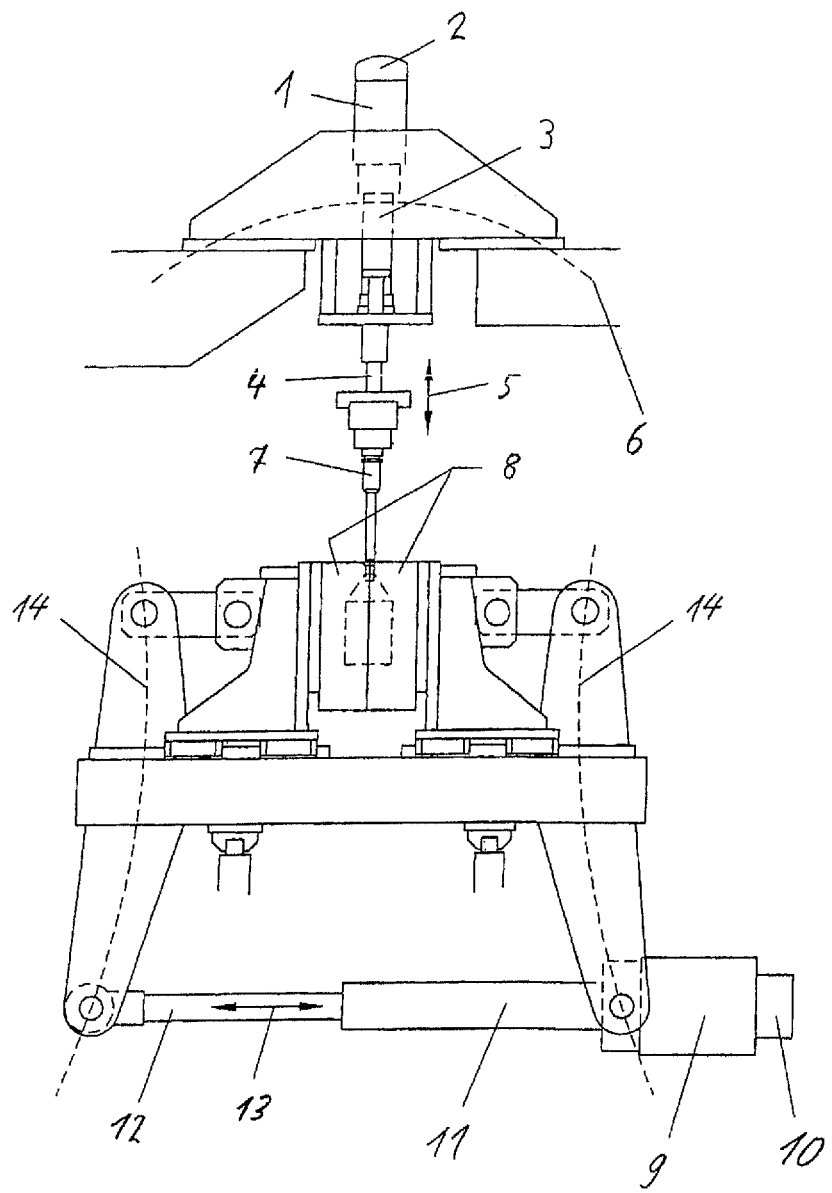

ARRANGEMENT AND METHOD FOR THE ELECTROMECHANICAL DRIVE FOR MOLDING CLOSING SYSTEMS AND CALIBRATION BLOW MANDREL SYSTEMS IN BLOW MOLDING MACHINES

FIELD OF INVENTION

The invention relates to an arrangement and to a method for the electromechanical drive for mold closing systems and calibration blow mandrel systems in blow molding machines.

BACKGROUND INFORMATION

Drives for mold closing systems and calibration blow mandrel systems in blow molding machines on one hand need to be capable of performing fast movements in order to facilitate a rapid opening of the mold in connection with a swift removal of the molded article. On the other, they have to be able to apply, for a period of up to tens of seconds, the high forces required during the blow molding process. Currently, either hydraulic cylinders or several electric motors are employed for this purpose.

Hydraulic cylinders, abeit meeting the aforementioned requirements, are highly energy-intensive, require regular and laborious maintenance, are not suited for cleanroom production and feature a low level of positioning accuracy.

Even though electric motors do not suffer the same shortcomings, one and the same electric motor cannot deliver both, fast movements and high forces. It is for this reason that known electromechanical drives in blow molding machines utilize two separate electric motors: While a first "fast and weak" motor is active during a first phase of the movement, characterized by fast motion at a low force, a second "slow and strong" motor actuates during a second phase, characterized by slow motion at a high force (see DE 199 32 741 A 1, DE 102 53 555 B3 and DE 200 15 590 U 1). However, construction and control of these two-step electromechanical drives feature a high degree of complexity, giving rise to an elevated risk of faulty operation as well as high production costs.

SUMMARY OF INVENTION

The present invention relates to an electromechanical drive for mold closing systems and calibration blow mandrel systems in blow molding machines in which fast movements can be provided and the high closing and calibration forces can be reliably maintained and reduced again over a longer time period for a permanent operation with low effort and/or expense.

An arrangement for the drive of an extrusion blow molding machine is proposed which includes a push mechanism, a push rod and at least one electric motor, wherein the push rod is movable by the push mechanism which is driven by the electric motor, wherein the electric motor has an additional braking device which can be activated on the reaching of a required torque of the electric motor or on the reaching of a required force of the electric motor to hold the push rod in a state of a the required torque or in a state of the required force in its instantaneous position, wherein the electric motor is exactly one electric motor and the additional braking device can be activated for torque values of the electric motor up to twice the nominal torque of the electric motor or for force values of the electric motor up to twice the nominal force of the electric motor. This arrangement allows the maintenance of high forces for mold closing systems and calibration blow mandrel systems without the use of additional elements to amplify forces. With a changed mold thickness and calibration depth, no additional adaptation is required since the system works analogously to a directly acting hydraulic cylinder except for the activation and deactivation of the braking device. The arrangement can be used without restrictions for all mold closing systems and calibration systems in which directly acting hydraulic cylinders were previously used.

In contrast to a simple "injection blow molding machine", it is preferably an extrusion blow molding device in the present case. The difference between an injection mold blowing machine and a "pure" extrusion blow molding machine is that a pre-form generated by injection is brought into a mold and inflated in injection blowing. Only a closing force is required there which acts against the inflation pressure and holds the mold closed so that comparatively small forces are sufficient here. In extrusion blow molding machines, in contrast, a hot extruded tube is preferably simultaneously welded and sealed in squeezed over regions (base, neck, shoulder, handle). The mold preferably has special cutting edges for this purpose. The high closing force required for this is dependent on the welding seam length and on the material used. The force must be built up spontaneously at the moment of the mold closure. Conventional electrical linear motors cannot maintain this build-up of force for a period of seconds or tens of seconds, as is required during a blow molding process. In the present invention, the maintenance of a high closing force generated at the moment the mold is closed by means of a utilization of the briefly possible high peak torques of the motor or by means of a utilization of the briefly possible high peak forces of the motor and the holding of this force (spring tension due to the elasticity of the involved components) is taken up by means of an additional braking device.

The torque or the force that the additional braking device needs to withstand during the blow molding process in order to keep the mold closely shut is equal in magnitude to the torque or the force which the electric motor must exert for welding, sealing and squeezing the blank. The exact value of the required closing torque or closing force depends on the resin used for the blank, its thickness and its particular geometry. Typical values for extrusion blow molding machines are in the range of between tens and hundreds of kilo Newtons, corresponding to the gravitational force acting on a mass of up to several ten tons. In an embodiment of the invention, a required torque or force of the electric motor can be pre-set such that the additional braking device is activated upon the motor's torque or force reaching this particular value.

Importantly, the aforementioned peak torque or peak force which the electric motor can briefly exert can be up to five times the nominal torque or the nominal force of the electric motor. Here, the terms nominal torque or nominal force designate the maximum torque or the maximum force which the electric motor is capable of maintaining without wear for at least 30 minutes of continuous operation. Typically, an electric motor can sustain the peak torques or peak forces (as opposed to the nominal torques or nominal forces) for a period of up to several hundreds of milliseconds. Making use of the motor's peak torque or of the motor's peak force in combination with the application of the additional braking device renders utilizing a second "slow and strong" electric motor dispensable. This is because one and the same "fast and weak" electric motor can drive the machine during its fast moving phase at a low force and subsequently can, for a brief moment, provide a high enough torque or a high enough force for the closure of the mold. By means of the additional braking device this high torque or high force can be maintained throughout the blow molding process. An additional holding apparatus is not needed.

Since it is the additional braking device which maintains the torque or force required for keeping the mold shut during the blow molding process, the electric motor is switched to a currentless state during this period. As a side effect of this procedure energy consumption is reduced considerably.

After completion of the blow molding process the additional braking device can be deactivated and the mold opened so that the molded article can be removed and a new pre-form inserted in the mold. For a smooth opening of the mold it is particularly advantageous to re-activate the electric motor to its previous torque or force level before the additional braking device is deactivated. This way unnecessary strain of the involved components due to a sudden build up of high forces can be avoided.

As a result of the simplified arrangement according to the invention, the complexity of its construction and control is greatly reduced as compared to known two-motor electromechanical drives. Not only is the failure of a single motor less probable than the failure of one of two motors. In addition, the precisely timed and precisely tuned acceleration and deceleration that is necessary for operating a two-motor drive can entirely be dispensed with. Hence, fault liability and production costs can be lowered significantly. A sealing of the opening of the article to be blown occurs on the blow mandrel movement at the moment of the contact of the blow mandrel with the plastic and the mold. A spontaneously applied high force is equally required for this purpose. In both cases, it is not the inflation pressure which is decisive for the force to be generated, but rather the required welding and sealing force.

The arrangement can completely replace both the hydraulic drives for mold closing systems and for calibration blow mandrel systems of an extrusion blow molding machine.

Since the electric motor can be switched into a currentless state after an activation of the braking device, drive energy is saved to a substantial degree.

The braking device can be designed both as a brake acting in rotation and as a brake acting in translation.

To maintain the mold closing and calibration forces, the elastic deformability of at least one mechanical part of the mold closing systems and calibration blow mandrel systems which is in force flow can be utilized.

If the molding closing systems and/or calibration blow mandrel systems have a high stiffness, an additional spring can be used to improve the elastic deformability.

The electric motor can have a high speed and a briefly accessible high peak torque at which the braking device can then be activated to switch the electric motor into a currentless state and to achieve high energy efficiency.

The braking device can be releasable with an electric motor again excited to the previously generated torque for a material-saving reduction of mold closing or calibration forces.

The point in time for an activation of the braking device on the reaching of the required torque of the electric motor can be set for an ideal manner of operation.

A mechanical stroke is linearly dependent on the revolutions of the motor and can thus be determined from motor data. The force of the drive is proportional to a motor current and can be determined from the motor current with reference to the engine characteristics.

The current increase for the activation of the electric motor can be delayed to achieve a strain which is low as possible on the mechanically stressed parts and a long service life for them.

Since the electric motor only requires a very small time of a maximum of 0.3 seconds for the build-up of the required force and since the blowing procedure can amount to 4 to 25 seconds, the motor can in each case be switched to currentless for over 90% of the total blowing time and thus substantial energy can be saved by the arrangement in accordance with the invention.

In order to allow for the maintenance of higher mold closing forces the additional braking device can additionally be activated for torque values between two and three times the nominal torque of the electric motor or for force values between two and three times the nominal force of the electric motor.

In order to allow for the maintenance of even higher mold closing forces the additional braking device can additionally be activated for torque values between three and four times the nominal torque of the electric motor or for force values between three and four times the nominal force of the electric motor.

In order to allow for the maintenance of yet higher mold closing forces the additional braking device can additionally be activated for torque values between four and five times the nominal torque of the electric motor or for force values between four and five times the nominal force of the electric motor.

In order to allow for the maintenance of the highest possible mold closing forces the additional braking device can additionally be activated for torque values between five times the nominal torque and the peak torque of the electric motor or for force values between five times the nominal force and the peak force of the electric motor.

A method is furthermore proposed for the drive in a blow molding machine, with said method comprising the following steps describing one complete cycle of the drive:

activation of exactly one electric motor for the moving out of a push rod starting from an initial position by means of a push mechanism;

activation of an additional braking device of the electric motor on the reaching of a required torque of the electric motor or on the reaching of a required force of the electric motor to hold the push rod in a state of the required torque or in a state of the required force in its instantaneous position;

switching the electric motor into a curentless state;

de-activating the additional braking device of the electric motor after a given blow molding process time and activating the electric motor for the moving in of the push rod by means of the push mechanism and moving the push rod back in its initial position by means of the electric motor and the pushing mechanism.

The arrangement in accordance with the invention can be operated in an advantageous manner using this method.

The method can relate to the drive of a mold closing system of a blow molding machine and/or to the drive of a calibration blow mandrel system of a blow molding machine.

In order to build up the high forces neeed during the blow molding process, the absolute value of a maximum torque or of a maximum force exerted by the electric motor immediately before activating the additional braking device is at least 1.5-fold the nominal torque or the nominal force of the electric motor.

A point in time $T_1$ marking the beginning of the machine motion in a blow molding cycle is given by activating the electric motor for the moving out of the push rod starting from an initial position by means of the pushing mechanism;

a point in time $T_3$ marking the onset of the blow molding process is given by the activation subsequent to $T_1$ of the additional braking device;

a point in time $T_2$ marking the onset of the build up of a high torque or a high force and immediately preceeding $T_3$ is given by the absolute value of a torque of the electric motor exceeding a nominal torque of the electric motor by at least 1.5-fold or by the absolute value of a force of the electric motor exceeding a nominal force of the electric motor by at least 1.5-fold;

a first continuous time interval $\Delta T_1$ corresponding to the total duration of both, the essentially torque-less or force-less phase of the motion and the torque-intensive or force-intensive phase of the motion, is given by the initial point $T_1$ and the end point $T_3$;

a second continuous time interval $\Delta T_2$ corresponding to the duration of the torque-intensive or force-intensive phase of the motion alone is given by the initial point $T_2$ and the end point $T_3$ and the length of the continuous time interval $\Delta T_2$ is at most two percent the length of the continuous time interval $\Delta T_1$.

The electric motor can again be activated to the previously generated torque after a preset blow molding process time before a deactivation of the braking device for a material-saving manner of operation.

BRIEF DESCRIPTION OF DRAWINGS

An embodiment of the invention will be explained in the following with reference to FIG. 1.

There is shown

FIG. 1 a cross-section through a mold closing system and a calibration blow mandrel system of a blow molding machine.

DETAILED DESCRIPTION

In FIG. 1, a cross-section through a mold closing system and a calibration blow mandrel system of a blow molding machine is shown.

The calibration blow mandrel system has exactly one electric motor 1, a braking device 2, a pushing mechanism 3, a push rod 4 and a calibration blow mandrel in calibrating position 7. The braking device 2 and the push mechanism 3 are arranged at the electric motor 1. The push rod 4 is arranged within the push mechanism 3 movable in movement directions 5. The calibration blow mandrel 7 is arranged at the push rod 4.

The mold closing system has exactly one electric motor 9, a braking device 10, a push mechanism 11, a push rod 12 and a blow mold 8, divided into two halves, into which the calibration blow mandrel 7 is introduced. The braking device 10 and the push mechanism 11 are arranged at the electric motor 9. The push rod 12 is arranged within the push mechanism 11 movable in movement directions 13. The mold halves 8 are each mounted on a carrier plate. To allow for the opening and closing of the mold the two carrier plates are movably arranged on a common bearing which is fixed on a frame plate. The carrier plates can be moved along the axis of the bearing by means of a sliding mechanism. Two levers which are rotatably connected to the frame plate transmit the movement of the push rod 12 to the carrier plates and the mold halves 8: The rotation axes of the two levers are arranged in parallel with respect to each other, lie in the plane of the frame plate, and are perpendicular to the bearing and the axis of motion of the carrier plates. The rotation axis of each lever divides the respective lever into a shorter upper lever arm and a longer lower lever arm. The two upper lever arms are each connected to one of the two carrier plates via a connecting rod. By contrast, the two lower lever arms are coupled one to the end of the push rod 12 and the other to the end of the push mechanism 11. According to this embodiment, the moving out of the push rod 12 along the direction 13 results in a closing motion of the two mold halves 8. After the blow molding process the mold can be re-opened by the moving in of the push rod 12. The Moving out of the push rod 12 starting from an initial position and the moving in of the same push rod 12 back to its initial position constitute one complete cycle of the motion of the mold closing system.

To close the blow mold 8 and to hold it closed with a high force for a blow molding process, the electric motor 9 is activated to drive the push mechanism 11. The push mechanism 11, preferably designed as a spindle drive, moves the push rod 12 out of the push mechanism 11 and the electric motor 9 reaches the required torque. Directly after the blow mold 8 has been closed with high force by an elastic deformation 14, the braking device 10 is activated to hold the push rod 12 in a state of constantly maintained tension in its instantaneous position and to hold the blowing mold 8 closed with a required closing force.

After a blow molding process has taken place within the closed blow mold 8, the electric motor 9 is again excited to the previously generated torque and the braking device 2 is deactivated to open the blow mold for a removal of the blank.

Analog to the closing force for the mold closing system, the calibration force for the calibration system is applied, maintained and reduced again by the electric motor 1, the braking device 2, the push mechanism 3 and the push rod 4 by means of an elastic deformation 6.

The electric motors 1 and 9 are adapted for a high speed and a briefly accessible high peak torque and the braking devices 2 and 10 are adapted to act in rotation or in translation.

With a mold closing system and a calibration blow mandrel system which have high stiffness, an additional spring is used to increase the elastic deformability.

The time for an activation of the braking devices 2 and 10 can be set for an ideal manner of operation on the reaching of the required torque of the electric motors 9 and 11.

A mechanical stroke is linearly dependent on the revolutions of the motor and can thus be determined from motor data. The force of the drive is proportional to a motor current and can be determined from the motor current with reference to the engine characteristics.

A delayed current increase is carried out for the activation for a strain on the mechanically stressed parts which is as low as possible and for a long service life for them.

Since the time in which the electric motors can be switched to currentless takes up more than 90% of the time of a total blow molding process, the arrangement in accordance with the invention allows a substantial energy-saving.

REFERENCE NUMERAL LIST 1 electric motor of the calibration system
2 braking device of the calibration system
3 push mechanism of the calibration system
4 push rod of the calibration system
5 movement directions of the calibration blow mandrel
6 elastic deformation of the calibration system
7 calibration blow mandrel in a calibrating position
8 closed blow mold
9 electric motor of the mold closing system
10 braking device of the mold closing system
11 push mechanism of the mold closing system
12 push rod of the mold closing system
13 movement directions of the mold closing system
14 elastic deformation of the mold closing system

The invention claimed is:

1. A method for driving at least one of (a) a mold closing system and (b) a calibration blow mandrel system of an extrusion blow molding machine, comprising of the following steps:

activating exactly one electric motor to move out a push rod starting from an initial position using a push mechanism;

activating an additional braking device of the electric motor on a reaching of one of (a) a required torque of the electric motor and (b) a required force of the electric motor to hold the push rod in a state of one of (i) the required torque and (ii) the required force in its instantaneous position, wherein at least one of (i) the absolute value of a peak torque exerted by the electric motor immediately before the activating of the additional braking device is at least 1.5-fold a nominal torque of the electric motor and (ii) the absolute value of a peak force exerted by the electric motor immediately before the activating of the additional braking device is at least 1.5-fold a nominal force of the electric motor;

switching the electric motor into a currentless state;

re-activating the electric motor to one of the previously generated torque and the previously generated force after a preset blow molding process time;

subsequently de-activating the additional braking device;

activating the electric motor to move in the push rod using the push mechanism; and moving the push rod back in the initial position using the electric motor and the push mechanism.

2. A method in accordance with claim 1, wherein a point in time $T_1$ is marked by activating the electric motor for the moving out of the push rod using the pushing mechanism, wherein a point in time $T_3$ is marked by the activation subsequent to $T_1$ of the additional braking device, and wherein a point in time $T_2$ immediately preceding $T_3$ is marked by the absolute value of a torque of the electric motor exceeding a nominal torque of the electric motor by at least 1.5-fold, wherein a point in time $T_2$ immediately preceding $T_3$ is marked by the absolute value of a force of the electric motor exceeding a nominal force of the electric motor by at least 1.5-fold, wherein a first continuous time interval $\Delta T_1$ is marked by the initial point $T_1$ and the end point $T_3$; a second continuous time interval $\Delta T_2$ is marked by the initial point $T_2$ and the end point $T_3$, and a length of the continuous time interval $\Delta T_2$ is at most two percent the length of the continuous time interval $\Delta T_1$.

3. A method in accordance with claim 1, wherein the braking device acts in at least one of (a) rotation and (b) translation.

4. A method in accordance with claim 1, wherein an elastic deformability of at least one mechanical part of one of at least one of the mold closing system and the calibration blow mandrel system is utilized for a maintenance of at least one of a mold closing force and a calibration force.

5. A method in accordance with claim 4, wherein an additional spring is used to increase the elastic deformability.

6. A method in accordance with claim 1, wherein the force of the drive is determined with reference to motor characteristics from a current of the electric motor.

7. A method in accordance with claim 1, wherein a power increase for the activation of the electric motor is subjected to a delay.

8. A method in accordance with claim 1, wherein one of (a) the required force is built-up within a maximum of 0.3 seconds and (b) a blow procedure is carried out for between 4 and more than 25 seconds, wherein the electric motor is switched into the currentless state for over 90% of a total blowing time.

9. A method in accordance with claim 1, wherein the additional braking device is additionally activated for one of (a) torque values between two and three times the nominal torque of the electric motor and (b) force values between two and three times the nominal force of the electric motor.

10. A method in accordance with claim 1, wherein the additional braking device is additionally activated for one of (a) torque values between three and four times the nominal torque of the electric motor and (b) force values between three and four times the nominal force of the electric motor.

11. A method in accordance with claim 1, wherein the additional braking device is additionally activated for one of (a) torque values between four and five times the nominal torque of the electric motor and (b) force values between four and five times the nominal force of the electric motor.

12. A method in accordance with claim 1, wherein the additional braking device is additionally activated for one of (a) torque values between five times the nominal torque and the peak torque of the electric motor and (b) force values between five times the nominal force and the peak force of the electric motor.

13. A method in accordance with claim 1, wherein the braking device is activated at a predetermined time.

* * * * *